Nov. 6, 1956
A. W. FRANK
2,769,695
ENDOTHERMIC GENERATOR RETORT
Filed June 4, 1953
2 Sheets-Sheet 2
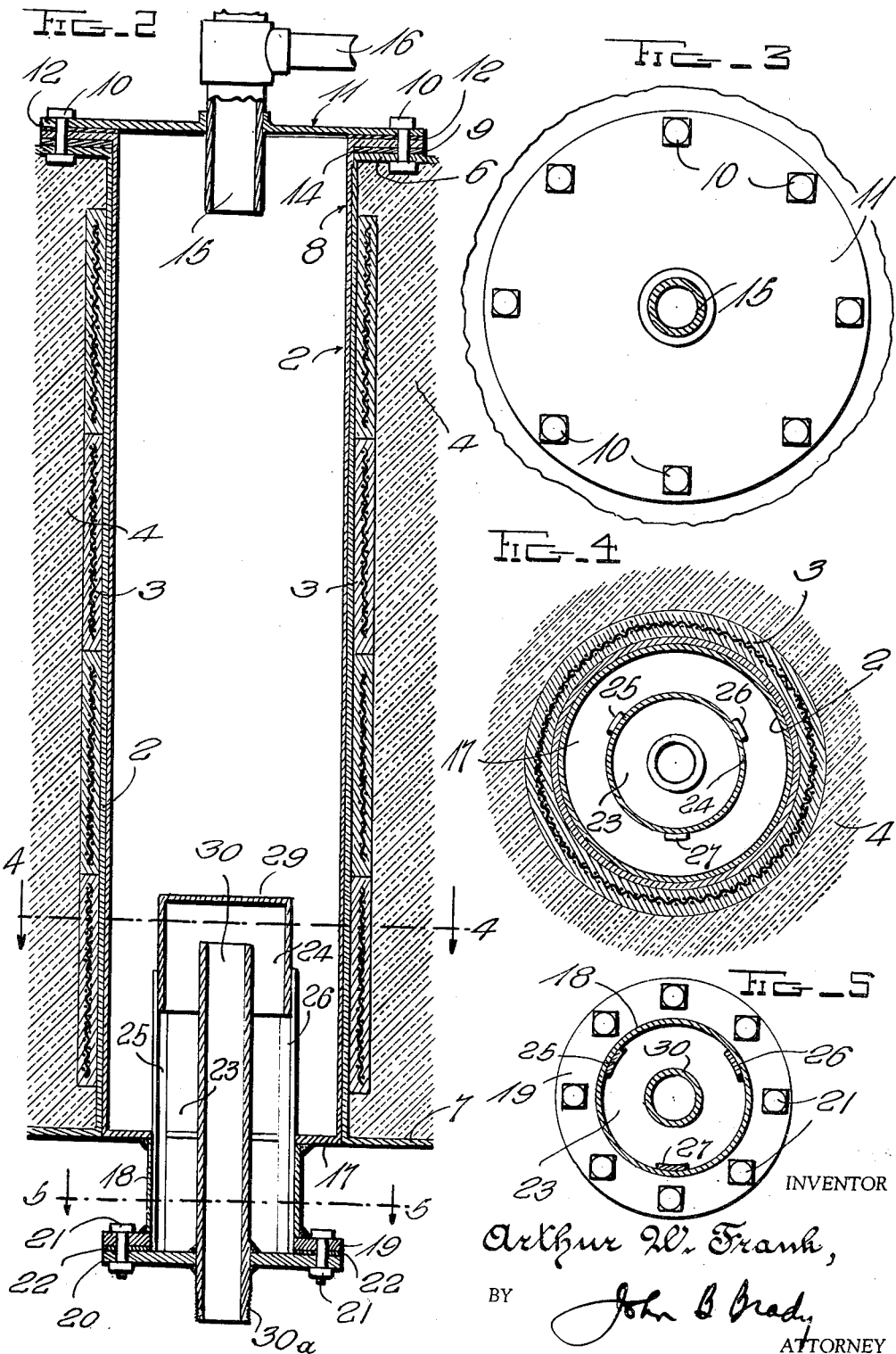

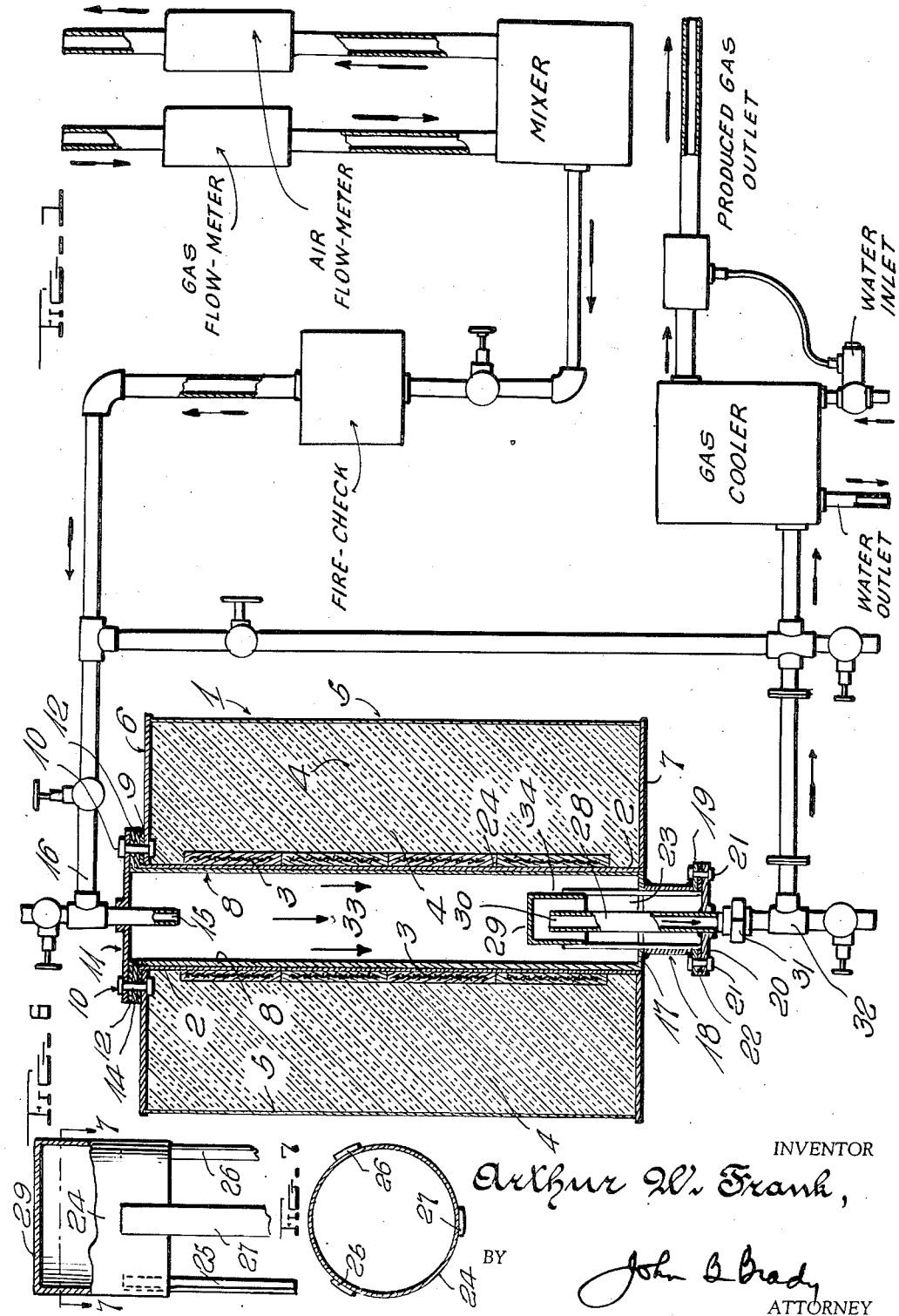

United States Patent Office 2,769,695
Patented Nov. 6, 1956

2,769,695

ENDOTHERMIC GENERATOR RETORT

Arthur W. Frank, Delafield, Wis., assignor to Hevi Duty Electric Company, Milwaukee, Wis., a corporation of Wisconsin Application June 4, 1953, Serial No. 359,571

5 Claims. (Cl. 23—288)

My invention relates broadly to gas generator retorts and more particularly to a construction of gas generator retort having means for readily removing and replacing the catalyst.

One of the objects of my invention is to provide a construction of gas generator retort including a catalyst having means for protecting the catalyst against carbonaceous deposits.

Another object of my invention is to provide a construction of retort for gas generators in which the retort itself can be readily removed from the gas generator by a minimum of effort and replaced as a unit without appreciably interrupting the continuity of operation of the generator system.

A further object of my invention is to provide a construction of retort for gas generators containing means for allowing a free flow of gas through the retort to reduce back pressure and provide for more intimate contact between the gases and the catalyst material.

Still another object of my invention is to provide a structure of retort having mounting means for the catalyst which facilitates removal and replacement of the catalyst without dismantling the entire unit.

Other and further objects of my invention reside in an improved structure of retort and mounting and protective means for the associated catalyst in a gas generator system as set forth more fully in the specification hereinafter following, by reference to the accompanying drawings, in which:

Fig. 1 is a schematic view of an endothermic gas generator system showing the application of my invention thereto;

Fig. 2 is a vertical sectional view taken through the retort and illustrating the mounting for the catalyst and the manner of protecting the catalyst against carbon deposits during the operation of the generator system;

Fig. 3 is a top plan view of the retort showing the top flange which is readily removable when removing and replacing the retort;

Fig. 4 is a horizontal sectional view taken substantially on line 4—4 of Fig. 2;

Fig. 5 is a transverse sectional view taken substantially on line 5—5 of Fig. 2;

Fig. 6 is a side view partially in section showing the carbon deposit protective means employed in the retort in accordance with my invention; and Fig. 7 is a top plan view of the carbon deposit protective means illustrated in Fig. 6.

My invention is directed to an improved construction of endothermic generator in which certain mixtures of a gas and air react in the presence of a catalyst at a certain temperature to produce an atmosphere consisting primarily of carbon monoxide, hydrogen and nitrogen. The raw gas may be propane ($CH_3CH_2CH_3$), natural gas or other commonly used gases. The reaction tends to deposit carbon on the catalyst material. The deposited carbon tends to reduce the effectiveness of the catalyst, increase the back pressure by impeding the flow of gases through the retort and reduce the quality of the produced atmosphere. Various methods of regenerating the catalyst material by removing the carbon deposit are used; however, if sufficient carbon is deposited in the catalyst bed, these methods are no longer effective.

My invention facilitates regeneration of the catalyst bed and reduces the rate at which carbon is deposited in the retort. I provide a trap in the gas flow path for collecting the excess carbon and reducing carbon accumulation in the service lines. The arrangement of my invention provides a means for allowing a free flow of gas through the retort to reduce back pressure and provide more intimate contact between the gases and the catalyst material. I provide an outlet pipe baffle can which serves as a protective means for preventing carbon deposit upon the catalyst or carbon accumulation in the service lines and serves as an additional support for the catalyst material. The structure of the retort is such that the entire retort can be readily removed by disconnecting a single union and a flange, permitting the removal of the catalyst material from the generator. The structure is such that the catalyst material may be removed when the retort is either hot or cold, and the removal can be effected in less time than is possible in structures as heretofore known. The shut-down time of the generator is substantially reduced because the catalyst material can be removed, reconditioned and replaced in a time period of the order of ninety minutes. The catalyst material can be removed without dismantling the entire unit. It is only necessary to remove the bottom plate of the retort to remove the catalyst and to remove the top plate to replace the catalyst. The retort may be readily inspected when the catalyst bed has been removed, and this inspection can be made without dismantling the unit.

Referring to the drawings in more detail, the endothermic generator system is shown in Fig. 1 including the generator represented by reference character 1 comprising the internal casing 2 which extends longitudinally of the generator and is surrounded by the electric heating elements which I have represented generally in the position 3. The heating elements 3 are surrounded by heat insulation material represented at 4 and enclosed by casing 5 extending between headers 6 and 7. The internal casing 2 extending axially of the generator serves as a receiver for the cylindrical retort 8. Retort 8 is provided at its upper end with a flange 9 which extends peripherally beyond the retort and serves as a means for replaceably mounting the retort in the header 6 of the casing 2. The flange 9 is secured to the open end of retort 8 and extends radially therefrom and is attached to header 6 by means of bolts 10 which pass through the end plate 11 and through gasket 12, flange 9, gasket 14 and are secured in the header 6. The end plate 11 supports the intake pipe 15 which extends axially into the center of the retort and is connected at its exterior end with the intake pipe system represented at 16 in Fig. 1.

The opposite end of the retort 8 is closed by an annular plate 17 secured at its outer periphery with retort 8 and carrying a depending tubular sleeve of reduced section indicated at 18 to which there is attached the annular flange 19. The annular flange 19 serves as a connecting means for the removable annular plate 20 connected to annular flange 19 by bolts 21 and sealed by means of gasket 22. The annular flange 19 carries the inwardly extending protective baffle support 23 which is annularly spaced from the inner wall of the retort 8. The inwardly extending baffle support protective means projects interiorly of the retort 8 spaced above the end of the outlet pipe protective means or baffle 24. The baffle 24 is cylindrical in structure and is provided with downwardly extending legs 25, 26 and 27 which fit within the internal cylindrical surface of the sleeve 18 and extend downwardly therein. The legs 25, 26 and 27 are of such length that they serve to elevate the outlet pipe protective means or baffle 24 above the end of the outlet pipe 30 leaving gap 28 therebetween the legs and above the annular plate 17 within the retort. The upper end of baffle 24 is closed by circular plate 29 and thus provides a removable trap around the inner terminating end of the outlet pipe 30. The outlet pipe 30 is supported in the removable plate 20 and is screw threaded at its exterior end, as represented at 30a, for connection through the union 31 with the outlet pipe system 32. Thus the path of gas through the retort 8 must be from intake pipe 15 through the catalyst located in the area 33, around the annular zone 34 between the inside wall of retort 8 and the outside cylindrical wall of the outlet pipe protective means 24, and thence through the gaps 28 between legs 25, 26 and 27 and beneath the outlet pipe protective means 24 and then into the open end of outlet pipe 30. Thus carbon deposits are entrapped, and are not permitted to flow through the system.

An understanding of the inlet and outlet connections is not essential for purposes of explaining my invention, and I have illustrated a conventional arrangement schematically by block diagram in Fig. 1. The important considerations are that the flow of the gas through the retort should be free of excess carbon for reducing carbon accumulation in service lines. A more intimate contact is provided between the gases and the catalyst material in the structure of my invention, and because of the arrangement of the plate 29 on top of the baffle 24, additional support is provided for the catalyst material in the area 33. The catalyst material can be quickly removed without dismantling the entire unit. It is only necessary to remove the bottom plate 20 of the retort and drop the baffle 24 to remove the catalyst and to remove the top plate 11 to replace the catalyst.

I have found the structure of my invention highly practical in its manufacture, production and operation, and while I have described my invention in one of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. In a gas retort a casing, a longitudinally extending cylindrical internal housing within said casing, a retort having a flange on one end thereof, said retort being slidable through said longitudinally extending internal housing with said flange abutting against the end of said casing, an end plate secured over said flange, means securing said end plate and said flange to said casing, an intake pipe extending through said end plate, said retort carrying a cylindrical sleeve at the other end thereof having a diameter less than the internal diameter of said retort, said sleeve projecting downwardly from said retort and terminating in an annular flange at the terminating end thereof, a removable end plate carried by said last-mentioned flange, an outlet pipe mounted centrally of said last-mentioned removable plate, said outlet pipe extending interiorly within the last-mentioned end of said retort in spatial relation to both said sleeve and said retort and a protective baffle support mounted within said sleeve and extending adjacent the internal end of said outlet pipe in spatial relation thereto, a flat protective plate carried by said protective baffle support for restricting the passage of carbon through said outlet pipe, said baffle support providing means for mounting a catalyst intermediate said inlet and outlet pipes.

2. A gas retort, as set forth in claim 1, in which said protective baffle support is constituted by an inverted cup-shaped member flattened on the top thereof for mounting a catalyst, and having a skirt extending around the end of said outlet pipe and supported by spaced legs that extend from said last-mentioned end plate and spatially maintain the inverted cup-shaped member in spatial relation to the interior of the retort.

3. A gas retort, as set forth in claim 1, in which said outlet pipe is screw threaded at the exterior projecting end thereof adjacent said last-mentioned end plate and wherein the said screw-threaded end is detachably engaged with an outlet pipe system through an external removable union, whereby upon detachment of said first-mentioned flange from said casing and detachment of said external union, said retort and said sleeve assembly may be removed longitudinally through the casing.

4. A gas generator comprising a casing having a cylindrical bore extending longitudinally therethrough, a cylindrical retort slidable through one end of said bore and attachable to said casing, a gas intake pipe located at the top of said retort, a gas outlet pipe located at the base of said retort, a well in the base of said retort having a transverse section substantially less than the transverse section of said retort and depending below the end of the bottom of said retort and surrounding said gas outlet pipe in annular spaced relation thereto, and means supported from said well and extending over the top of said gas outlet pipe in spatial relation thereto and spaced from the interior wall of said retort for supporting a catalyst intermediate said gas intake and said gas outlet pipes and restricting the distribution of carbon through said gas outlet pipe.

5. A gas generator as set forth in claim 4 in which said means supported in said well comprises an inverted cup-shaped member and spaced legs extending therein and into said well, said inverted cup-shaped member having a flattened top thereon for mounting the catalyst thereon and being spaced from the end of said outlet pipe and being spaced from the interior wall of said retort and said legs establishing contact with the inner walls of said well and being spaced from said outlet pipe, said inverted cup being spaced from the end of said retort to facilitate the passage of gas around said inverted cup and into the open end of said gas outlet pipe beneath said inverted cup.

References Cited in the file of this patent

UNITED STATES PATENTS

| 825,796 | Bartlett et al. | July 10, 1906 |
| 2,615,795 | Peck et al. | Oct. 28, 1952 |
| 2,645,567 | Thomas et al. | July 14, 1953 |

FOREIGN PATENTS

| 243,282 | Great Britain | Nov. 26, 1925 |